(No Model.)

F. J. WILES.
AXLE BOX.

No. 367,171. Patented July 26, 1887.

WITNESSES:
John M. Deemer
C. Sedgwick

INVENTOR:
F. J. Wiles
BY Munn & Co.
ATTORNEYS.

UNITED STATES PATENT OFFICE.

FREDERICK J. WILES, OF GRASSY POINT, NEW YORK.

AXLE-BOX.

SPECIFICATION forming part of Letters Patent No. 367,171, dated July 26, 1887.

Application filed January 24, 1887. Serial No. 225,302. (No model.)

*To all whom it may concern:*

Be it known that I, FREDERICK J. WILES, of Grassy Point, in the county of Rockland and State of New York, have invented a new and Improved Self-Oiling Axle and Axle-Box, of which the following is a full, clear, and exact description.

The object of my invention is to provide a practical self-oiling axle and axle-box for wheeled vehicles; and the invention consists in making the journal portion of the axle hollow to receive oil, and with small orifices for the escape of the oil to the surface of the axle.

The invention also consists in forming the axle with a collar, over which the axle-box fits, the axle-box being held in the hub of the wheel by a nut that closes the end of the hollow axle.

The invention finally consists in making the axle-box in two semi-cylindrical parts, each constructed to fit over the flange or collar formed upon the axle, as hereinafter described and claimed.

Reference is to be had to the accompanying drawings forming a part of this specification, in which similar letters of reference indicate corresponding parts in both the figures.

Figure 1:
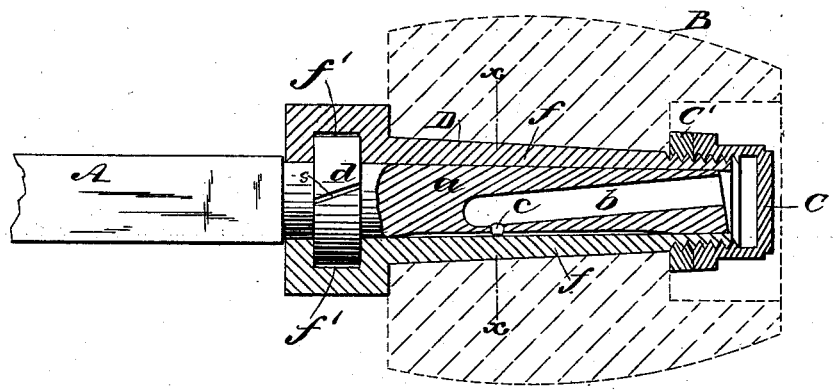
Figure 2:
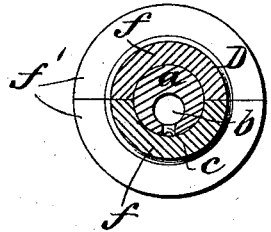

Figure 1 is a sectional elevation of a part of my new axle and axle-box, showing the hub of the wheel in dotted lines; and Fig. 2 is a transverse sectional elevation of the axle and axle-box, taken on the line $x\ x$ of Fig. 1.

A represents the axle, formed with the journal-point $a$, on which the wheel revolves. The point $a$ is made with a downwardly-sloping chamber, as shown at $b$, for oil, and is formed with one or more orifices $c$ for oil to pass from $b$ to the outer surface of the point $a$. The point $a$ is also formed with the circular collar or flange $d$, which, in connection with the nut $c$ and axle-box D, holds the wheel-hub B upon the point $a$ of the axle.

The box D is made in two semi-cylindrical parts, $f f$, each of which is formed with semi-annular recess $f'$ to fit over the collar $d$, as shown in Fig. 1.

The central opening in the hub E of the wheel fits upon the outer surface of the box D, and the hub is held in place upon the box by the nut C and screw-washer C', both of which screw upon the outer end of the two parts of the box D when the same are put together.

In use, to oil the axle the nut C has simply to be removed and the oil poured into the chamber $b$ and the nut replaced, The wheel is not to be removed at any time except for repairs, which may be done by removing nut C and washer C' and drawing the hub E off from the box D.

The oil-chamber $b$ in the axle-point $a$ is downwardly inclined, so that the oil as it is used will flow down to the orifice, and so that it will cause all of the oil to be used, and prevent drying and gumming of any oil in the passage $b$; and in the collar $d$, I form a slot, S, to retain oil carried up by the revolution of the axle-box and carry the same over to the opposite side of the collar.

Having thus described my invention, what I claim as new, and desire to secure by Letters Patent, is—

The axle A, formed with the collar $d$, the inclined oil-chamber $b$, and the orifice $c$, and the box formed of the two parts $f$, each formed with a curved and enlarged channel, $f'$, to fit over the collar $d$, in combination with the washer C', hub B, and point-nut C, substantially as described.

FREDERICK J. WILES.

Witnesses:
CHAS. WEIANT,
WILLIAM McCAULEY, Jr.